(12) United States Patent
Cho et al.

(10) Patent No.: US 9,338,372 B2
(45) Date of Patent: May 10, 2016

(54) COLUMN-BASED HIGH DYNAMIC RANGE IMAGING SYSTEMS

(71) Applicant: Semiconductor Components Industries, LLC, Phoeniz, AZ (US)

(72) Inventors: Kwangbo Cho, San Jose, CA (US); Dongsoo Kim, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 281 days.

(21) Appl. No.: 13/940,055

(22) Filed: Jul. 11, 2013

(65) Prior Publication Data

US 2014/0078365 A1    Mar. 20, 2014

Related U.S. Application Data

(60) Provisional application No. 61/703,192, filed on Sep. 19, 2012.

(51) Int. Cl.
*H04N 5/335* (2011.01)
*H04N 5/355* (2011.01)

(52) U.S. Cl.
CPC ........... *H04N 5/335* (2013.01); *H04N 5/35554* (2013.01)

(58) Field of Classification Search
CPC .............. H04N 5/335; H04N 5/35554; H04N 5/35545; H04N 5/35563; H04N 5/35572; H04N 5/353
See application file for complete search history.

(56) References Cited

U.S. PATENT DOCUMENTS

| | | | |
|---|---|---|---|
| 5,144,442 | A | 9/1992 | Ginosar et al. |
| 5,247,366 | A | 9/1993 | Ginosar et al. |
| 6,518,558 | B1 | 2/2003 | Bohm et al. |
| 7,084,905 | B1 | 8/2006 | Nayar et al. |
| 7,382,407 | B2 | 6/2008 | Cho et al. |
| 7,397,509 | B2 | 7/2008 | Krymski |

(Continued)

FOREIGN PATENT DOCUMENTS

| | | |
|---|---|---|
| EP | 2375383 | 12/2011 |
| EP | 2515273 | 10/2012 |

OTHER PUBLICATIONS

Huai Dong Li et al., U.S. Appl. No. 13/646,453, filed Oct. 5, 2012.

(Continued)

*Primary Examiner* — Lin Ye
*Assistant Examiner* — Amy Hsu
(74) *Attorney, Agent, or Firm* — Treyz Law Group, P.C.

(57) ABSTRACT

Electronic devices may have camera modules that include an image sensor and processing circuitry. An image sensor may include a pixel array having pixel rows and pixel columns. The image pixels in a pixel row may include long-integration pixels and short-integration pixels. Row control signal lines for each pixel row may include a row-select control line, a reset control line, and two transfer control lines or may include a row-select control line, two reset control lines, and a transfer control line. Row control circuitry may be used to operate the pixel array to capture a column-interleaved image with short-exposure pixel values and long-exposure pixel values interleaved in a column-based pattern. The column-interleaved image may be used to form an interpolated short-exposure image and an interpolated long-exposure image from which a column-based interleaved high-dynamic-range image is generated.

12 Claims, 6 Drawing Sheets

(56) References Cited

U.S. PATENT DOCUMENTS

| | | | |
|---|---|---|---|
| 7,907,209 B2 | 3/2011 | Au et al. | |
| 7,911,518 B2 | 3/2011 | Yosefin | |
| 8,013,919 B2 | 9/2011 | Yaffe et al. | |
| 8,237,813 B2 | 8/2012 | Garten | |
| 8,279,328 B2 | 10/2012 | Lahav et al. | |
| 8,305,487 B2 | 11/2012 | Cha et al. | |
| 8,405,750 B2 | 3/2013 | Smith et al. | |
| 8,542,315 B2 * | 9/2013 | Sorek | H04N 5/35554 348/231.99 |
| 8,582,006 B2 * | 11/2013 | Smith | H01L 27/14621 348/223.1 |
| 8,625,013 B2 | 1/2014 | Jannard | |
| 8,749,665 B2 * | 6/2014 | Wang | H04N 5/378 348/229.1 |
| 8,792,019 B2 | 7/2014 | Yuyama | |
| 8,798,395 B2 | 8/2014 | Jo | |
| 8,994,843 B2 * | 3/2015 | Atanassov | H04N 5/35581 348/222.1 |
| 2002/0180875 A1 | 12/2002 | Guidash | |
| 2003/0038296 A1 | 2/2003 | Merrill | |
| 2003/0103158 A1 | 6/2003 | Barkan et al. | |
| 2003/0128405 A1 * | 7/2003 | Tay | H04N 1/32358 358/474 |
| 2003/0169359 A1 | 9/2003 | Merrill et al. | |
| 2004/0189844 A1 | 9/2004 | McCaffrey et al. | |
| 2005/0045980 A1 | 3/2005 | Guidash | |
| 2005/0099504 A1 | 5/2005 | Nayar et al. | |
| 2005/0128327 A1 | 6/2005 | Bencuya et al. | |
| 2005/0167574 A1 | 8/2005 | He et al. | |
| 2005/0243177 A1 | 11/2005 | Kang et al. | |
| 2006/0103745 A1 * | 5/2006 | Nagaishi | H04N 5/235 348/294 |
| 2006/0145203 A1 | 7/2006 | Toros et al. | |
| 2006/0192867 A1 | 8/2006 | Yosefin | |
| 2006/0192873 A1 * | 8/2006 | Yaffe | H04N 5/353 348/297 |
| 2007/0040922 A1 | 2/2007 | McKee et al. | |
| 2007/0285526 A1 * | 12/2007 | Mann | H04N 5/23245 348/222.1 |
| 2008/0158398 A1 | 7/2008 | Yaffe et al. | |
| 2008/0219585 A1 | 9/2008 | Kasai et al. | |
| 2008/0267522 A1 | 10/2008 | Kobayashi | |
| 2009/0002525 A1 | 1/2009 | Um et al. | |
| 2009/0021612 A1 | 1/2009 | Hamilton et al. | |
| 2009/0040349 A1 | 2/2009 | Xu | |
| 2009/0040364 A1 | 2/2009 | Rubner | |
| 2009/0091645 A1 | 4/2009 | Trimeche et al. | |
| 2009/0109306 A1 * | 4/2009 | Shan | H04N 5/235 348/273 |
| 2009/0135263 A1 | 5/2009 | Sorek | |
| 2009/0190015 A1 * | 7/2009 | Bechtel | H04N 5/2355 348/302 |
| 2009/0256942 A1 | 10/2009 | McCaffrey et al. | |
| 2009/0268063 A1 | 10/2009 | Ellis-Monaghan et al. | |
| 2009/0273696 A1 | 11/2009 | Krymski | |
| 2010/0141792 A1 * | 6/2010 | Arai | H04N 5/23248 348/229.1 |
| 2010/0259636 A1 | 10/2010 | Tzur et al. | |
| 2010/0277631 A1 * | 11/2010 | Sugiyama | H04N 5/374 348/297 |
| 2011/0090365 A1 | 4/2011 | Cha et al. | |
| 2011/0096085 A1 | 4/2011 | Cha et al. | |
| 2012/0236169 A1 | 9/2012 | Choe et al. | |
| 2012/0281111 A1 | 11/2012 | Jo et al. | |
| 2012/0287294 A1 | 11/2012 | Kaizu et al. | |
| 2012/0328025 A1 | 12/2012 | Chang et al. | |
| 2014/0027613 A1 * | 1/2014 | Smith | H04N 5/2352 250/208.1 |
| 2014/0267828 A1 * | 9/2014 | Kasai | H04N 9/045 348/229.1 |
| 2015/0092079 A1 | 4/2015 | Li et al. | |

OTHER PUBLICATIONS

Huai Dong Li, U.S. Appl. No. 13/786,199, filed Mar. 5, 2013.
Huai Dong Li et al., U.S. Appl. No. 13/755,988, filed Jan. 31, 2013.

* cited by examiner

COLUMN-BASED HIGH DYNAMIC RANGE IMAGING SYSTEMS

This application claims the benefit of provisional patent application No. 61/703,192, filed Sep. 19, 2012 which is hereby incorporated by reference herein in its entirety.

BACKGROUND

The present invention relates to imaging devices and, more particularly, to high-dynamic-range imaging systems.

Image sensors are commonly used in electronic devices such as cellular telephones, cameras, and computers to capture images. In a typical arrangement, an electronic device is provided with an image sensor having an array of image pixels and a corresponding lens. Some electronic devices use arrays of image sensors and arrays of corresponding lenses.

In certain applications, it may be desirable to capture high-dynamic range images. While highlight and shadow detail may be lost using a conventional image sensor, highlight and shadow detail may be retained using image sensors with high-dynamic-range imaging capabilities.

Common high-dynamic-range (HDR) imaging systems use multiple images that are captured by the image sensor, each image having a different exposure time. Captured short-exposure images may retain highlight detail while captured long-exposure images may retain shadow detail. In a typical device, image pixel values from short-exposure images and long-exposure images are selected to create an HDR image. Capturing multiple images can take an undesirable amount of time and/or memory.

In some devices, HDR images are generated by capturing a single interleaved long-exposure and short-exposure image in which alternating pairs of rows of pixels are exposed for alternating long and short integration times. The long-exposure rows are used to generate an interpolated long-exposure image and the short-exposure rows are used to generated an interpolated short-exposure image. A high-dynamic-range image can then be generated from the interpolated images.

However, because this type of row interleaved image capture method captures long-exposure image data and short-exposure image data separated by the time it takes to read out multiple pixel rows, HDR images generated in this may include artifacts as motion artifacts and row temporal noise artifacts.

It would therefore be desirable to provide improved imaging systems for high-dynamic-range imaging.

DETAILED DESCRIPTION

Electronic devices such as digital cameras, computers, cellular telephones, and other electronic devices include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels) arranged in pixel rows and pixel columns. Image sensors may include control circuitry such as row control circuitry for operating the image pixels on a row-by-row bases and column readout circuitry for reading out image signals corresponding to electric charge generated by the photosensitive elements along column lines coupled to the pixel columns.

Figure 1:
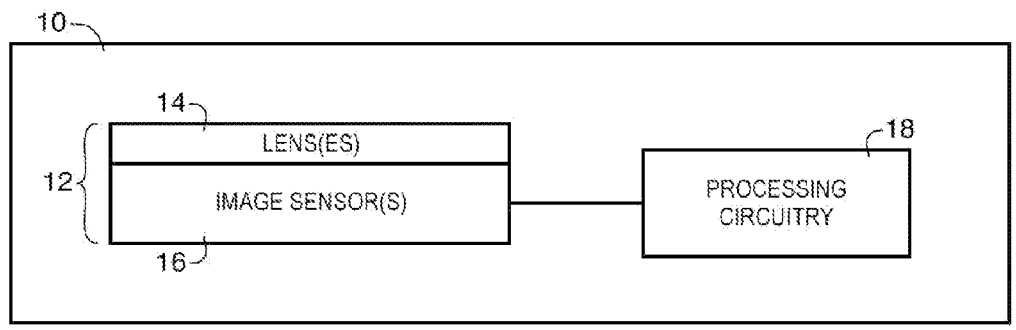
FIG. 1 is a diagram of an illustrative imaging system in accordance with an embodiment of the present invention.

FIG. 1 is a diagram of an illustrative electronic device with an image sensor for capturing images. Electronic device 10 of FIG. 1 may be a portable electronic device such as a camera, a cellular telephone, a video camera, or other imaging device that captures digital image data. Device 10 may include a camera module such as camera module 12 coupled to control circuitry such as processing circuitry 18. Camera module 12 may be used to convert incoming light into digital image data. Camera module 12 may include one or more lenses 14 and one or more corresponding image sensors 16. During image capture operations, light from a scene may be focused onto each image sensor 16 using a respective lens 14. Lenses 14 and image sensors 16 may be mounted in a common package and may provide image data to processing circuitry 18.

Processing circuitry 18 may include one or more integrated circuits (e.g., image processing circuits, microprocessors, storage devices such as random-access memory and non-volatile memory, etc.) and may be implemented using components that are separate from image sensor 16 and/or that form part of image sensor 16 (e.g., circuits that form part of an integrated circuit that controls or reads pixel signals from image pixels in an image pixel array on image sensor 16 or an integrated circuit within image sensor 16). Image data that has been captured by image sensor 16 may be processed and stored using processing circuitry 18. Processed image data may, if desired, be provided to external equipment (e.g., a computer or other device) using wired and/or wireless communications paths coupled to processing circuitry 18.

The dynamic range of an image may be defined as the luminance ratio of the brightest element in a given scene to the darkest element the given scene. Typically, cameras and other imaging devices capture images having a dynamic range that is smaller than that of real-world scenes. High-dynamic-range (HDR) imaging systems are therefore often used to capture representative images of scenes that have regions with high contrast, such as scenes that have portions in bright sunlight and portions in dark shadows.

An image may be considered an HDR image if it has been generated using imaging processes or software processing designed to increase dynamic range. Image sensor 16 may be a column-based interleaved high-dynamic range (CiHDR) image sensor. A CiHDR image sensor may generate high-dynamic-range images using a column-based interleaved exposure (sometimes referred to herein as a column-based interleaved integration (CII)) image capture process. In a column-based interleaved integration process may be performed using an image pixel array with columns of long-integration image pixels that are interleaved with columns of short-integration image pixels.

The columns of long-integration image pixels may be operable to generate long-exposure image pixel values during a long-integration exposure time. The columns short-integration image pixels may be operable to generate short-exposure image pixel values during a short-integration exposure time. Interleaved long-exposure and short-exposure image pixel values from image pixels in a common pixel row may be readout simultaneously along column lines coupled to the image pixels. Interleaved long-exposure and short-exposure image pixel values from all active pixel rows may form a column-based interleaved image.

The long-exposure and short-exposure image pixel values in each column-based interleaved image may be interpolated to form interpolated long-exposure and short-exposure values. A long-exposure image and a short-exposure image may be generated using the long-exposure and the short-exposure pixels values from the interleaved image frame and the interpolated long-exposure and short-exposure image pixel values. The long-exposure image and the short-exposure image may be combined to produce a composite CiHDR image which is able to represent the brightly lit as well as the dark portions of the image.

Figure 2:
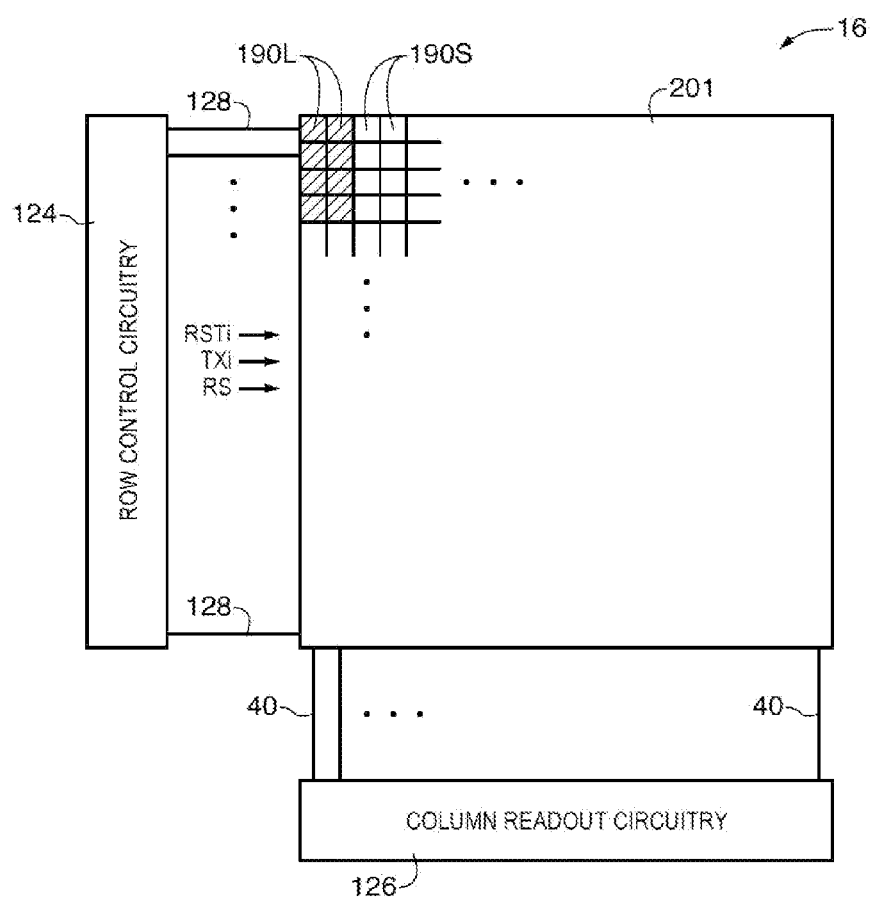
FIG. 2 is a diagram of an illustrative pixel array and associated row control circuitry for operating image pixels in pixel rows and column readout circuitry for reading out image data from image pixels along column lines in accordance with an embodiment of the present invention.

As shown in FIG. 2, image sensor 16 may include a pixel array 201 containing image sensor pixels such as long-exposure image pixels 190L and short-exposure image pixels 190S. Array 201 may include columns of long-exposure image pixels 190L that are interleaved with columns of short-exposure image pixels 190S.

Image sensor 16 may include row control circuitry 124 for supplying pixel control signals such as one or more reset signals (RSTi), one or more transfer signals (TXi), row-select signals (RS) and other read control signals to each pixel row in array 201 over row control paths 128. Conductive lines such as column lines 40 may be coupled to each of the columns of pixels in array 201. During pixel readout operations, a pixel row in array 201 may be selected by row control circuitry 124 and image data associated with that pixel row can be read out along respective column output lines 40 to column readout circuitry 126.

Column readout circuitry 126 may include sample-and-hold circuitry, amplifier circuitry, analog-to-digital conversion circuitry, column randomizing circuitry, column bias circuitry or other suitable circuitry for supplying bias voltages to pixel columns and for reading out image signals from pixel column in array 201.

Figure 3:
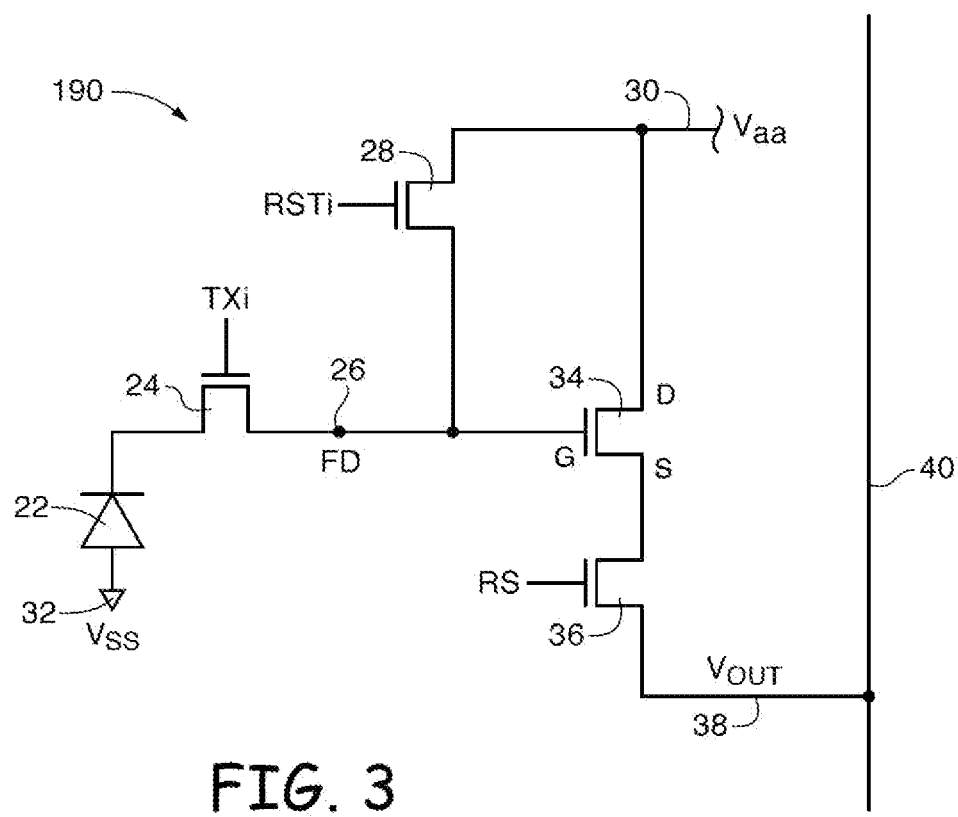
FIG. 3 is a diagram of an illustrative image sensor pixel in accordance with an embodiment of the present invention.

Circuitry in an illustrative pixel of one of image sensor pixels 190 in sensor array 16 is shown in FIG. 3. As shown in FIG. 3, pixel 190 includes a photosensitive element such as photodiode 22. A positive power supply voltage (e.g., voltage Vaa) may be supplied at positive power supply terminal 30. A ground power supply voltage (e.g., Vss) may be supplied at ground terminal 32 and ground terminal 218. Incoming light is collected by photodiode 22 after passing through a color filter structure. Photodiode 22 converts the light to electrical charge.

Before an image is acquired, reset control signal RSTi may be asserted. This turns on reset transistor 28 and resets charge storage node 26 (also referred to as floating diffusion FD) to Vaa. The reset control signal RSTi may then be deasserted to turn off reset transistor 28. After the reset process is complete, transfer control signal TXi may be asserted to turn on transfer transistor (transfer gate) 24. When transfer transistor 24 is turned on, the charge that has been generated by photodiode 22 in response to incoming light is transferred to charge storage node 26. Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 22. The signal associated with the stored charge on node 26 is conveyed to row-select transistor 36 by source-follower transistor 34.

When it is desired to read out the value of the stored charge (i.e., the value of the stored charge that is represented by the signal at the source S of transistor 34), row-select control signal RS can be asserted. When signal RS is asserted, transistor 36 turns on and a corresponding signal Vout that is representative of the magnitude of the charge on charge storage node 26 is produced on output path 38. In a typical configuration, there are numerous rows and columns of pixels such as pixel 190 in array 12. A vertical conductive path such as path 40 can be associated with each column of pixels. When signal RS is asserted in a given row, path 40 can be used to route signal Vout from that row to readout circuitry such as column readout circuitry 126 (see FIG. 2).

Reset control signal RSTi and transfer control signal TXi for each image pixel 190 in a pixel row may be one of two or more available reset control or transfer control signals. For example, a first pixel 190 in a pixel row may be a long-exposure pixel 190L that receives a reset control signal RST1 (or a transfer control signal TX1). An adjacent pixel 190 in that pixel row may be a short-exposure pixel that receives a separate reset control signal RST2 (or a separate transfer control signal TX2). In this way, image pixels 190 in a common pixel row may be used to capture interleaved long-exposure and short-exposure image pixel values that may be combined into a CiHDR image.

Figure 4:
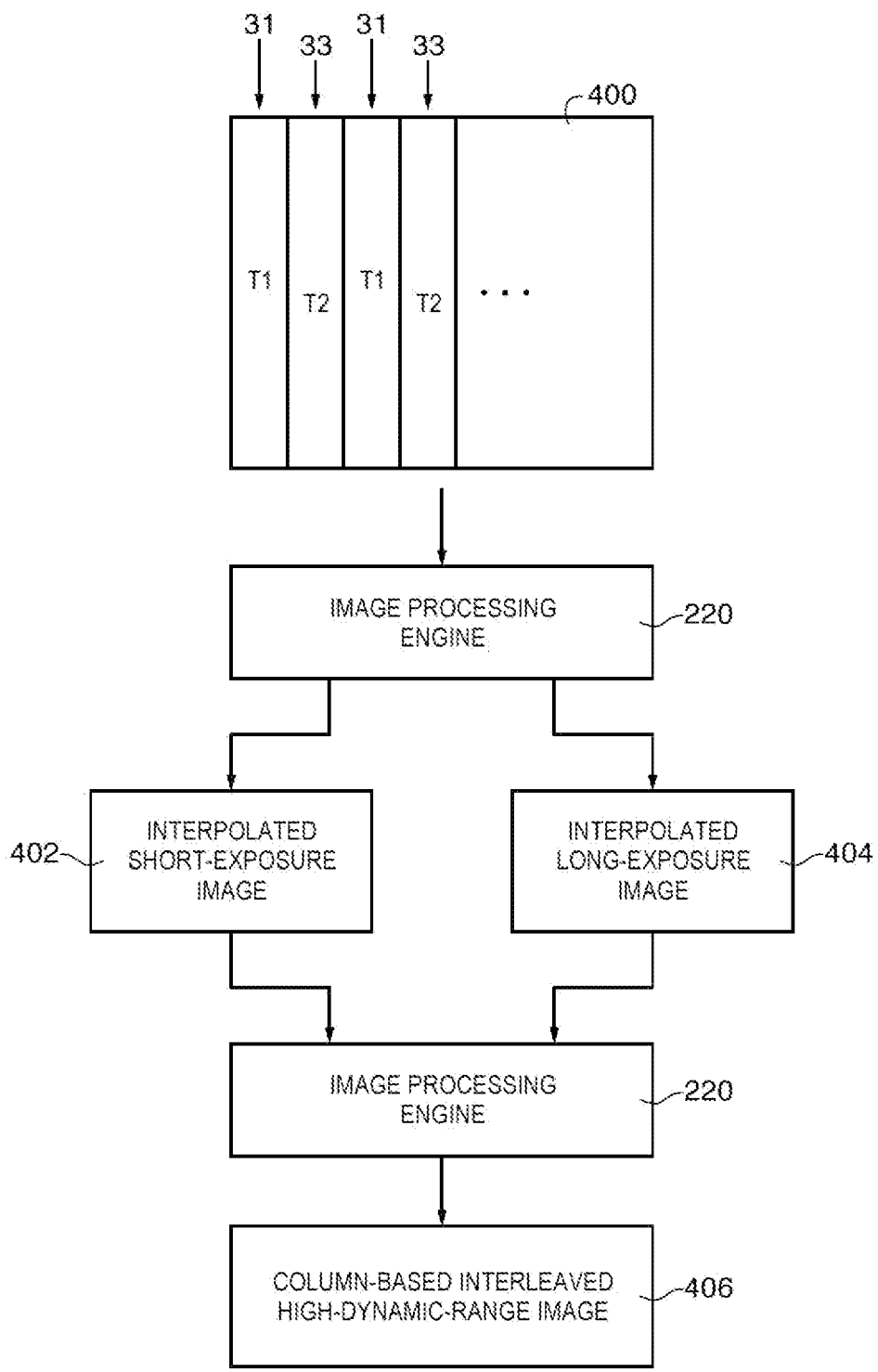
FIG. 4 is a diagram showing how illustrative first and second interpolated image frames may be generated from a column-interleaved image frame during generation of a high-dynamic-range image in accordance with an embodiment of the present invention.

FIG. 4 is a flow diagram showing how a column-based interleaved image can be processed to form a CiHDR image. As shown in FIG. 4, column-interleaved image 400 may include columns of pixel values 31 that have been captured using a first exposure time T1 such as a long-exposure time and columns of pixel values 33 that have been captured using a second exposure time T2 such as a short-exposure time.

Processing circuitry such as image processing engine 220 (e.g., software or hardware based image processing software on image sensor 16, formed as a portion of processing circuitry 18, or other processing circuitry associated with device 10) may be used to generate interpolated short-exposure image 402 and interpolated long-exposure image 404 using the pixel values of column-interleaved image 400. Interpolated short-exposure image 402 may be formed using short-exposure pixel values 33 of image 400 and interpolated pixel values based on those short-exposure pixel values in pixel locations at which image 400 includes long-exposure image pixel values 31. Interpolated long-exposure image 404 may be formed using long-exposure pixel values 33 of image 400 and interpolated pixel values based on those long-exposure pixel values in pixel locations at which image 400 includes short-exposure image pixel values 33. In this way, full short-exposure and long-exposure images may be generated using a single column-based interleaved image.

Image processing engine 220 may then be used to combine the pixel values of interpolated long-exposure image 404 and interpolated short-exposure image 402 to form column-based interleaved high-dynamic-range image (CiHDR) 406. For example, pixel values from interpolated short-exposure image 402 may be selected for CiHDR image 406 in relatively bright portions of image 406 and pixel values from interpolated long-exposure image 404 may be selected for CiHDR image 406 in relatively dim portions of image 406.

In order to provide image pixel array 201 with the ability to capture column-based interleaved image data, each row of pixels 190 may have more than one associated reset control line and/or more than one associated transfer control line.

Figure 5:
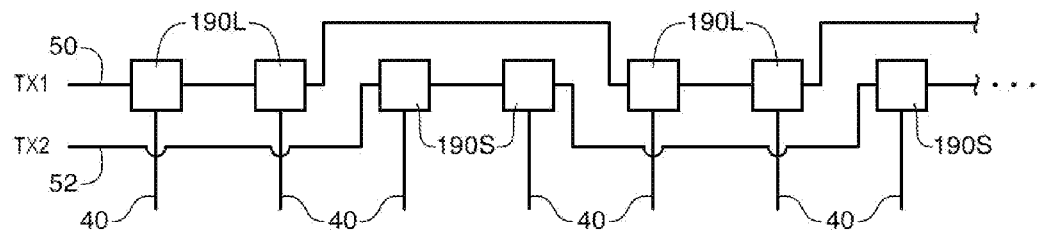
FIG. 5 is a diagram of illustrative transfer control lines for image sensor pixels in a pixel row in accordance with an embodiment of the present invention.

As shown in FIG. 5, a pixel row may include first transfer control line 50 for providing transfer control signal TX1 to long-exposure pixels 190L and second transfer control line 52 for providing transfer control signal TX2 to short-exposure pixels 190S. Each of pixels 190L and 190S may be coupled to a column line 40 for reading out image signals from that pixel. In configurations of the type shown in FIG. 5 in which each pixel row includes two transfer control lines, pixels 190L and 190S in a common row may be coupled to a common reset control line, a common row-select control line and/or other common row control signal lines.

Figure 6:
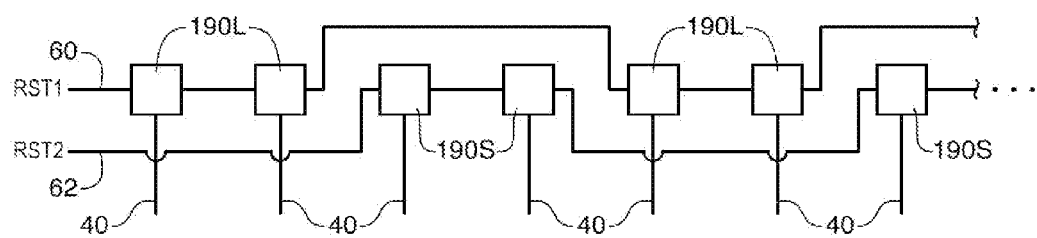
FIG. 6 is a diagram of illustrative transfer control lines for image sensor pixels in a pixel row in accordance with an embodiment of the present invention.

As shown in FIG. 6, a pixel row may include first reset control line 60 for providing reset control signal RST1 to long-exposure pixels 190L and second transfer control line 62 for providing reset control signal RST2 to short-exposure pixels 190S. Each of pixels 190L and 190S may be coupled to a column line 40 for reading out image signals from that pixel. In configurations of the type shown in FIG. 6 in which each pixel row includes two reset control lines, pixels 190L and 190S in a common row may be coupled to a common transfer control line, a common row-select control line and/or other common row control signal lines.

Figure 7:
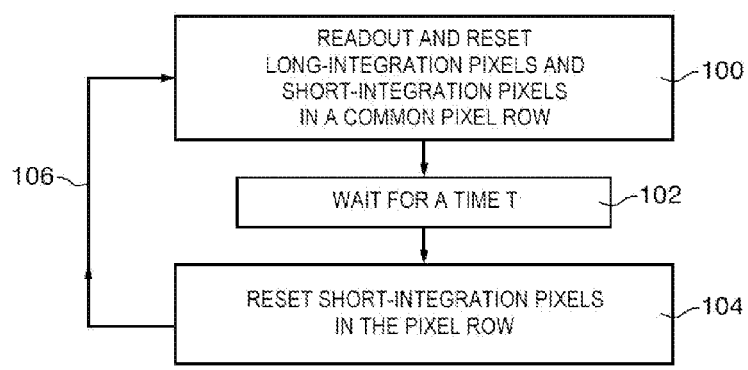
FIG. 7 is a flow chart of illustrative steps that may be used in capturing a column-interleaved image for generating a high-dynamic-range images in accordance with an embodiment of the present invention.

Illustrative steps that may be used in capturing column-based interleaved images such as image 400 using an image pixel array with multiple reset control lines such as reset control lines 60 and 62 for each pixel row are shown in FIG. 7.

At step 100, long-integration (long-exposure) pixels and short-integration (short-exposure) pixels in a common pixel row may be readout and reset. Reading out the pixels may include providing a common transfer control signal to the long-integration pixels and short-integration pixels to transfer charges from a photodiode in the sensor to a charge storage region and providing a common row-select signal to the long-integration pixels and short-integration pixels to allow image signals based on the transferred charges to be transmitted along column lines to column readout circuitry. Resetting the pixels may include providing a reset control signal to the long-integration pixels and short-integration pixels using lines 60 and 62 to reset the charge storage regions and/or the photodiodes of all pixels in the pixel row at a common time.

At step 102, image sensor 16 may wait for a time T.

At step 104, after the passage of time T, the short-integration pixels may be reset using a reset signal that does not affect the long-integration pixels. Following reset of the short-integration pixels, image sensor 16 may return to step 100 (as indicated by arrow 106) and readout and reset the long-integration pixels and the short-integration pixels. In this way, the short-integration pixels may be reset so that, between the reset at step 104 and the subsequent readout at step 100, a short-exposure time T2 has passed. The long-integration pixels may integrate for the entire time between subsequent readouts at step 100 so that a long-exposure time T1 passes between subsequent readouts.

Figure 8:
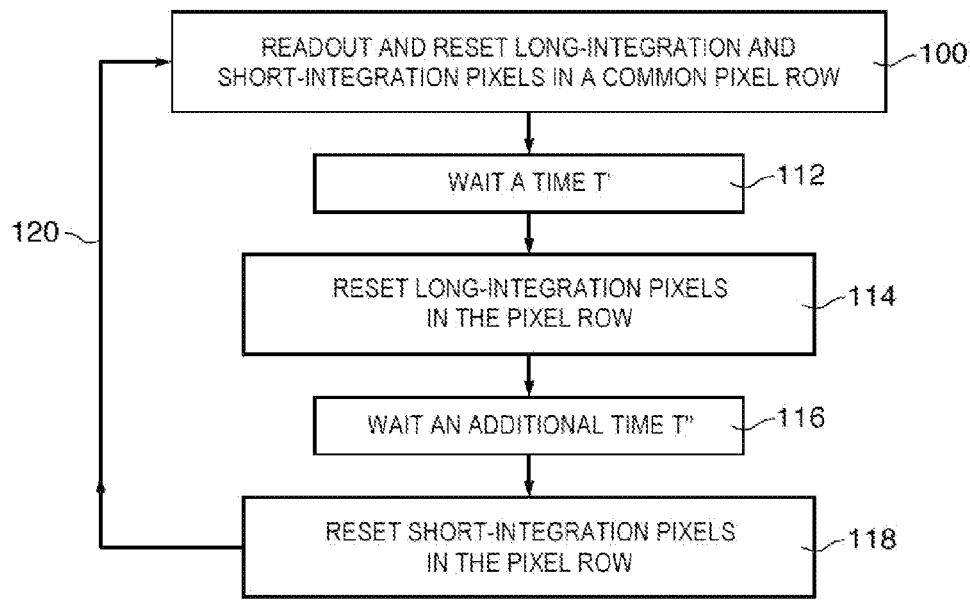
FIG. 8 is a flow chart of illustrative steps that may be used in capturing a column-interleaved image for generating a high-dynamic-range images in accordance with an embodiment of the present invention.

However, the steps of FIG. 7 are merely illustrative. If desired, long-exposure pixels may also be reset between subsequent readouts at step 100 as shown in the illustrative steps of FIG. 8.

At step 112, image sensor 16 may wait for a time T' after a readout and reset of all pixels in a common row at step 100.

At step 114, after the passage of time T', the long-integration pixels may be reset using a reset signal that does not affect the short-integration pixels.

At step 116, image sensor 16 may wait for an additional time T".

At step 118, after the passage of time T", the short-integration pixels may be reset using a reset signal that does not affect the long-integration pixels. Following reset of the short-integration pixels at step 118, image sensor 16 may return to step 100 (as indicated by arrow 120) and readout and reset the long-integration pixels and the short-integration pixels. In this way, the short-integration pixels may be reset so that, between the reset at step 116 and the subsequent readout at step 100, a short-exposure time T2 has passed. The long-integration pixels may be reset so that, between the reset at step 114 and the subsequent readout at step 100, a long-exposure time T1 has passed.

Figure 9:
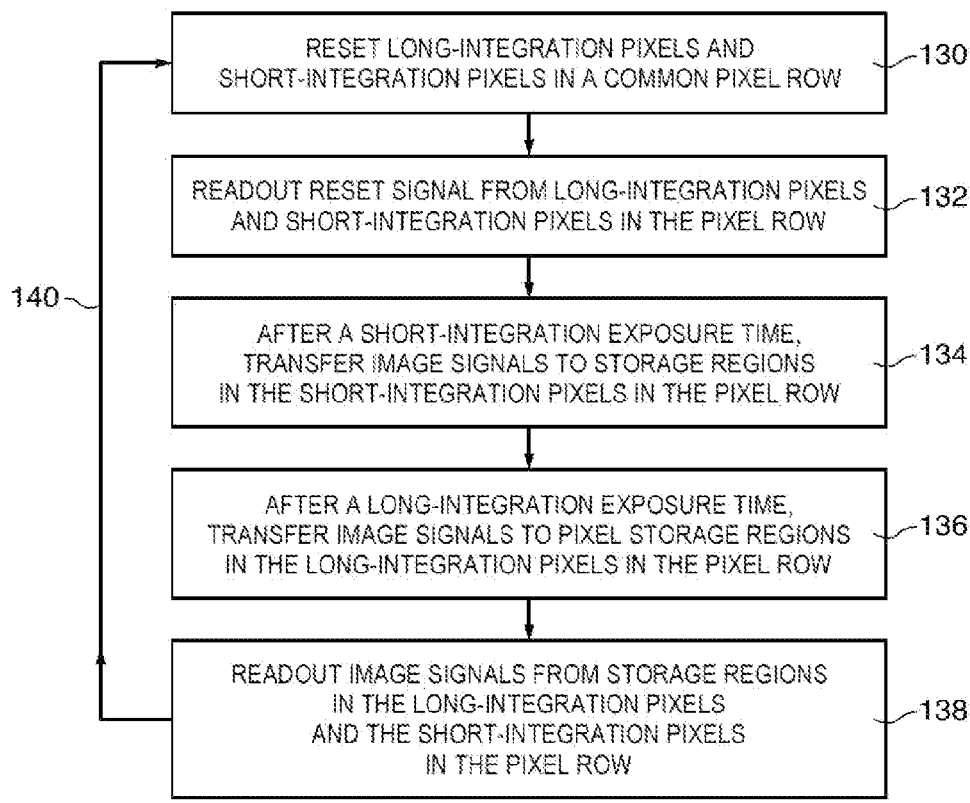
FIG. 9 is a flow chart of illustrative steps that may be used in capturing a column-interleaved image for generating a high-dynamic-range images in accordance with an embodiment of the present invention.

Illustrative steps that may be used in capturing column-based interleaved images such as image 400 using an image pixel array with multiple transfer control lines such as transfer control lines 50 and 52 for each pixel row are shown in FIG. 9.

At step 130, long-integration pixels and short-integration pixels in a common pixel row may be read out (along column lines 40) using a common reset signal.

At step 132, a reset signal may be readout from the long-integration pixels and the short-integration pixels in the pixel row.

At step 134, after a short-integration exposure time (a short-exposure time) in the reset at step 130, image signals (e.g., accumulated charges on photodiodes) may be transferred to charge storage regions in the short-integration pixels in the pixel row by providing, for example, transfer signal TX2 to the transfer gates of those pixels. The image signals may be transferred within the short-integration pixels while charges continue to accumulate in the long-integration pixels.

At step 136, after a long-integration exposure time (a short-exposure time) since the reset at step 130, image signals (e.g., accumulated charges on photodiodes) may be transferred to charge storage regions in the long-integration pixels in the pixel row by providing, for example, transfer signal TX1 to the transfer gates of those pixels.

At step 138, short-integration image signals and long-integration image signals may be readout from respective storage regions in the long-integration pixels and the short-integration pixels in the pixel row at a common time along column lines 40. Following step 138, image sensor 16 may return to step 130 as indicated by arrow 140 for capturing a subsequent image. The steps of FIGS. 7, 8, and/or 9 may be repeated for each pixel row in array 201.

Figure 10:
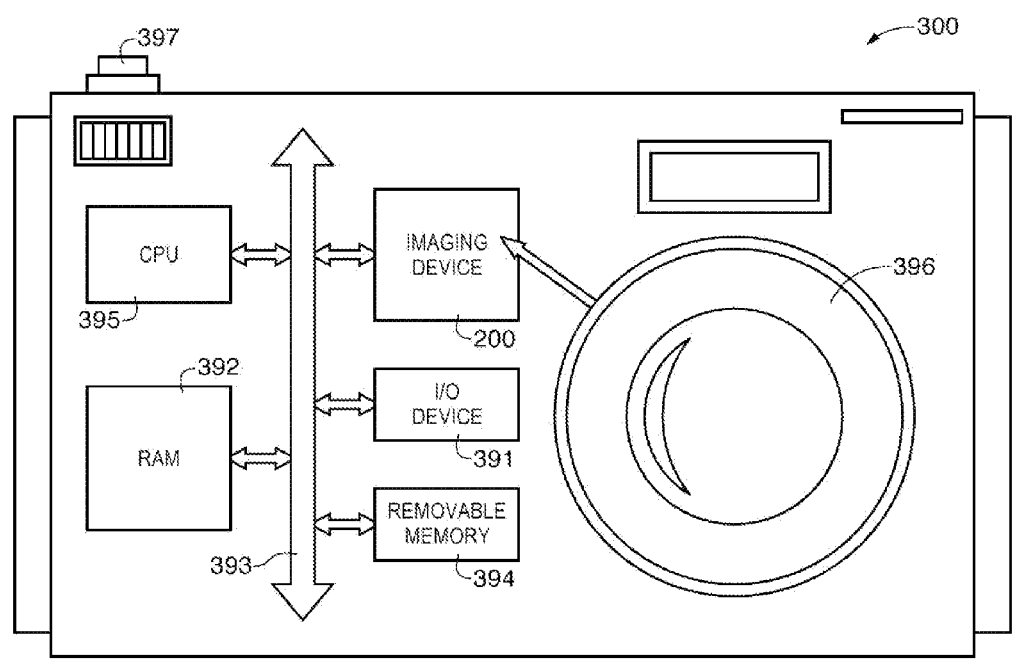
FIG. 10 is a block diagram of a processor system employing the image sensor of FIGS. 1-11 in accordance with an embodiment of the present invention.

FIG. 10 shows in simplified form a typical processor system 300, such as a digital camera, which includes an imaging device such as imaging device 200 (e.g., an imaging device 200 such as image sensor 16 of FIG. 1 configured to generate column-based interleaved high-dynamic-range images as described above in connection with FIGS. 1-9). Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating systems and methods for generating column-based interleaved HDR images of a scene using a camera module having an image sensor and processing circuitry.

An image sensor may include an array of image pixels arranged in pixel rows and pixel columns. The image pixels in a particular pixel row may include long-integration pixels and short-integration pixels. The pixel rows may each be coupled to row control signal lines for providing row control signals such as transfer control signals, reset signals, and row-select signals to each pixel row. The pixel columns may each be coupled to a column line for reading out image data to column readout circuitry.

The row control signal lines for each pixel row may include a row-select control line, a reset control line, and two transfer control lines or may include a row-select control line, two reset control lines, and a transfer control line.

In a configuration in which a pixel row includes a row-select control line, a reset control line, and two transfer control lines, a first transfer control line may be configured to provide a first transfer control signal to long-integration pixels in that pixel row and a second transfer control line configured to provide a second transfer control signal to short-integration pixels in that pixel row.

In a configuration in which a pixel row includes a row-select control line, two reset control lines, and a transfer control line, a first reset control line may be configured to provide a first reset control signal to long-integration pixels in that pixel row and a second reset control line configured to provide a second reset control signal to short-integration pixels in that pixel row.

The row control circuitry may be used to operate the pixel array to capture a column-interleaved image with short-exposure pixel values and long-exposure pixel values interleaved in a column-based pattern. The column-interleaved image may be used to form an interpolated short-exposure image and an interpolated long-exposure image. Image pixel values from the interpolated short-exposure image and the interpolated long-exposure image may be selected to form a column-based interleaved high-dynamic-range image.

The foregoing is merely illustrative of the principles of this invention which can be practiced in other embodiments.

What is claimed is:

1. An image sensor, comprising:
an array of image pixels arranged in pixel rows and pixel columns;
a conductive column line coupled to each pixel column;
column readout circuitry coupled to the pixel columns through the conductive column lines; and
row control circuitry configured to operate the array of image pixels to capture a column-interleaved image with short-exposure pixel values and long-exposure pixel values that are interleaved in a column-based pattern, wherein the row control circuity comprises first and second reset lines coupled to each pixel row, wherein the first reset lines are coupled to a first set of pixels in each pixel row that capture the long-exposure pixel values and the second reset lines are coupled to a second set of pixels in each pixel row that capture the short-exposure pixel values, and wherein the row control circuitry is configured to provide reset control signals over the first and second reset lines to perform at least two resets of both the first and second sets of pixels between consecutive readouts of the long and short-exposure pixel values from the array of image pixels.

2. The image sensor defined in claim 1, further comprising:
a first transfer control line coupled to each pixel row; and
a second transfer control line coupled to each pixel row.

3. The image sensor defined in claim 2 wherein the first transfer control line that is coupled to each pixel row is coupled to a first set of image pixels in that pixel row for capturing the short-exposure pixel values and wherein the second transfer control line that is coupled to each pixel row is coupled to a second set of image pixels in that pixel row for capturing the long-exposure pixel values.

4. The image sensor defined in claim 3 wherein the first set of image pixels and the second set of image pixels are interleaved sets of image pixels.

5. The image sensor defined in claim 1 wherein the first set of image pixels and the second set of image pixels are interleaved sets of image pixels.

6. The image sensor defined in claim 5, further comprising:
a transfer control line coupled to the first set of image pixels and the second set of image pixels each pixel row.

7. The image sensor defined in claim 1, wherein at least one of the resets of both the first and second sets of pixels occur at a common time.

8. The image sensor defined in claim 7, wherein the first set of pixels is reset at an additional time which is after the common time.

9. The image sensor defined in claim 8, wherein the second set of pixels is reset after the additional time.

10. A system, comprising:
a central processing unit;
memory;
input-output circuitry;
an imaging device, wherein the imaging device comprises:
an array of image pixels arranged in pixel rows and pixel columns, wherein each pixel row includes short-integration pixels and long-integration pixels, wherein both the long-integration pixels and the short-integration pixels are reset at a common time, wherein the short-integration pixels are configured to transfer short-exposure pixel values to first charge storage regions on the short-integration pixels after a first exposure duration from the common time, wherein the long-integration pixels are configured to transfer long-exposure pixel values to second charge storage regions on the long-integration pixels after a second exposure duration from the common time, wherein the second exposure duration is greater than the first exposure duration, a conductive column line coupled to each pixel column, and column readout circuitry coupled to the pixel columns through the conductive column lines, wherein the column readout circuitry is configured to read out the long-exposure pixel values from the second charge storage regions and the short-exposure pixel values from the first charge storage regions at a common readout time; and processing circuitry configured to generate a column-based interleaved high-dynamic-range image using a column-interleaved image captured by the array of image pixels.

11. The system defined in claim 10, wherein the imaging device further comprises row control circuitry configured to provide row control signals to each pixel row for capturing the column-interleaved image.

12. The image sensor of claim 10, wherein the short-exposure pixel values are transferred to the first charge storage regions before the long-exposure pixel values are transferred to the second charge storage regions.

* * * * *